US011022048B2

(12) United States Patent
Olivier et al.

(10) Patent No.: US 11,022,048 B2
(45) Date of Patent: Jun. 1, 2021

(54) METHOD AND A DEVICE FOR CONTROLLING THRUST FROM A TURBOJET

(71) Applicant: SAFRAN AIRCRAFT ENGINES, Paris (FR)

(72) Inventors: Amaury Olivier, Moissy-Cramayel (FR); Christophe Javelot, Moissy-Cramayel (FR); Darragh McGrath, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 690 days.

(21) Appl. No.: 15/314,048

(22) PCT Filed: May 13, 2015

(86) PCT No.: PCT/FR2015/051256
§ 371 (c)(1),
(2) Date: Nov. 25, 2016

(87) PCT Pub. No.: WO2015/181463
PCT Pub. Date: Dec. 3, 2015

(65) Prior Publication Data
US 2017/0198644 A1 Jul. 13, 2017

(30) Foreign Application Priority Data

May 27, 2014 (FR) .................................. 1454762

(51) Int. Cl.
*F02C 9/44* (2006.01)
*F02C 9/28* (2006.01)
*F02C 9/26* (2006.01)

(52) U.S. Cl.
CPC .............. *F02C 9/44* (2013.01); *F02C 9/26* (2013.01); *F02C 9/28* (2013.01); *F05D 2270/051* (2013.01); *F05D 2270/101* (2013.01)

(58) Field of Classification Search
CPC .......... F02C 9/00–58; F05D 2270/101; F05D 2270/051; B64C 13/18; F01D 19/00; F01D 21/003; F01D 21/14; F01D 17/06
See application file for complete search history.

(56) References Cited

U.S. PATENT DOCUMENTS 3,641,766 A * 2/1972 Uehling .................... F02C 3/06
                                                          60/262
4,217,754 A * 8/1980 Schmidt-Roedenbeck ..................
                                                          F02C 9/28
                                                          60/39.281

(Continued)

FOREIGN PATENT DOCUMENTS

EP      1 908 927 A1    4/2008
FR      2 992 355 A1   12/2013

(Continued)

OTHER PUBLICATIONS

International Search Report dated Aug. 12, 2015 in PCT/FR2015/051256 filed May 13, 2015.

(Continued)

*Primary Examiner* — Jason H Duger
(74) *Attorney, Agent, or Firm* — Oblon, McClelland, Maier & Neustadt, L.L.P.

(57) ABSTRACT

A method for controlling thrust from a turbojet that is fuel flow rate regulated by a high limit value for providing protection against surging of a compressor of the turbojet is provided. The method includes: obtaining a first thrust value corresponding to a first operating point of the compressor on the high limit value, the high limit value taking account of an underestimate of the fuel flow rate; controlling the (Continued)

turbojet to reach the first thrust value; monitoring the turbojet to detect underspeed of the compressor; and where applicable: obtaining a second thrust value corresponding to a second operating point that guarantees a predetermined margin relative to the high limit value so as to obtain protection against underspeed of the turbojet; and controlling the turbojet to reach the second value.

8 Claims, 4 Drawing Sheets

(56) References Cited

U.S. PATENT DOCUMENTS

| | | | | |
|---|---|---|---|---|
| 4,541,237 A * | 9/1985 | Dickey | ............... | F02C 9/28 60/39.281 |
| 4,686,825 A * | 8/1987 | Cavasa | ............... | F02C 9/00 60/243 |
| 4,809,500 A * | 3/1989 | Roberts, Jr. | ............... | F02C 9/28 60/235 |
| 5,107,674 A * | 4/1992 | Wibbelsman | ............... | F02C 7/26 60/778 |
| 5,718,111 A * | 2/1998 | Ling | ............... | F02C 7/26 60/39.281 |
| 7,094,019 B1 * | 8/2006 | Shapiro | ............... | F04D 27/0284 415/17 |
| 7,111,464 B2 * | 9/2006 | Rowe | ............... | F02C 9/28 60/39.281 |
| 7,757,549 B2 * | 7/2010 | Andreae | ............... | F02B 37/013 73/114.77 |
| 7,827,803 B1 | 11/2010 | Wadia et al. | | |
| 8,087,870 B2 * | 1/2012 | Flucker | ............... | F01D 17/162 415/1 |
| 8,601,786 B2 * | 12/2013 | Hurwitz | ............... | F01D 17/08 60/226.3 |
| 9,482,236 B2 * | 11/2016 | Khalid | ............... | F02C 9/18 |
| 9,790,807 B2 * | 10/2017 | Cointe | ............... | F02C 9/28 |
| 9,897,517 B2 * | 2/2018 | Djelassi | ............... | F02C 9/28 |
| 2005/0043905 A1 * | 2/2005 | Vary | ............... | F02C 9/26 702/45 |
| 2006/0101826 A1 * | 5/2006 | Martis | ............... | F01D 15/10 60/794 |
| 2013/0091851 A1 * | 4/2013 | Gaully | ............... | F02C 9/263 60/772 |
| 2013/0213053 A1 * | 8/2013 | Gaully | ............... | F02C 7/232 60/776 |
| 2015/0152790 A1 * | 6/2015 | Javelot | ............... | F02C 9/263 60/776 |
| 2015/0268073 A1 * | 9/2015 | Gaully | ............... | B64D 13/00 702/47 |

FOREIGN PATENT DOCUMENTS

| | | | |
|---|---|---|---|
| FR | 2 998 004 A1 | 5/2014 | |
| WO | WO-2013190237 A1 * | 12/2013 | ............... F02C 9/26 |

OTHER PUBLICATIONS

Brazilian Office Action dated May 12, 2020 in Brazilian Patent Application No. 112016027730 (with English translation), 6 pages.

* cited by examiner

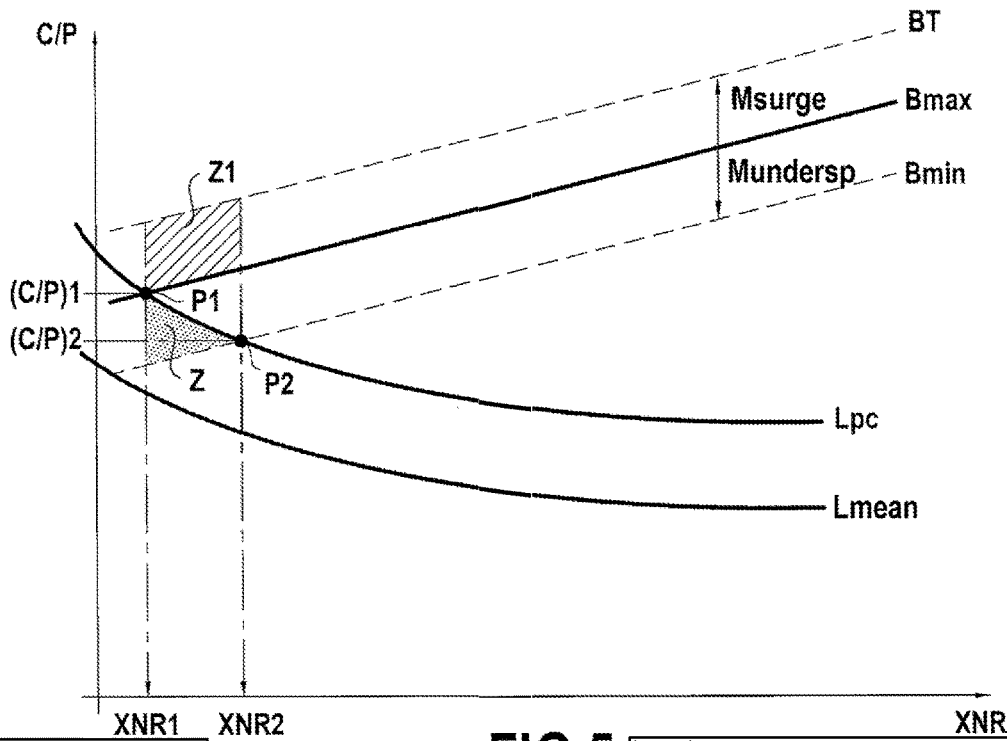

FIG.5

Legend:
C/P - ratio of fuel flow rate setpoint to outlet pressure from compressor
XNR - speed of turbojet
P1 - operating point
P2 - operating point
BT - theoretical limit value
Bmax - high limit value
Bmin - high limit value for the ratio C/P
Lpc - operating line of compressor
Lmean - mean operating line of compressor Legend:
XNR1 - speed of turbojet at operating point P1
XNR2 - speed of turbojet at operating point P2
(C/P)1 - ratio at operating point P1
(C/P)2 - ratio at operating point P2
Msurge - surge margin
Mundersp - underspeed margin
Z - zone of risk of surge
Z1 - zone

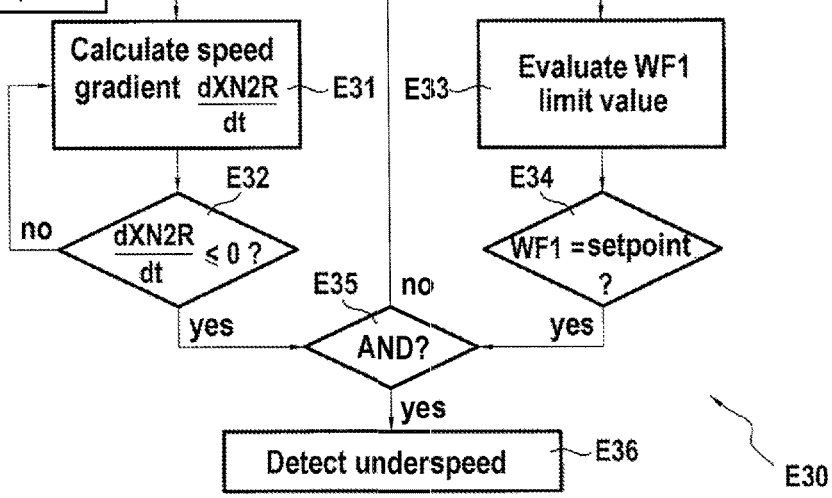

FIG.6

METHOD AND A DEVICE FOR CONTROLLING THRUST FROM A TURBOJET

BACKGROUND OF THE INVENTION

The invention relates to the general field of aviation.

It relates more particularly to controlling the thrust from an aircraft turbojet while it is idling, which turbojet may for example be a two-spool bypass turbojet having a low-pressure compressor and a high-pressure compressor. Thrust from the turbojet is the result of a certain quantity of air being accelerated between the inlet and the outlet of the compressor.

In known manner, the operating point of a high-pressure compressor of a turbojet is determined by the reduced flow rate of air WR at the inlet to the compressor and by the ratio of the total pressure Ps at the outlet from the compressor over the total pressure Pe at its inlet. As shown diagrammatically in FIG. 1A, this representation serves advantageously to model the operating line LFnom of the compressor (on the basis of various different operating points of the compressor) and also to model its limits, and more particularly zones in which there is a risk of the turbojet surging (defined by the surge line LPnom). It should be recalled that surging is an aerodynamic instability of the compressor of the turbojet that results from a large pressure difference between the inlet and the outlet of the compressor and that may be manifested in particular by the flow direction of the air inside the turbojet reversing.

When controlling the turbojet, it is known to make provision for the need for a residual margin known as the "surge margin stack-up" (marked STACK in FIG. 1A), between the surge limit and the operating line of the high-pressure compressor of an average new engine, to take account of various phenomena that can have an impact on the operation of the turbojet (e.g. aging of the turbojet, heat transfers, components dispersions, sensor inaccuracies, etc.). These phenomena lead to a higher operating line LFdet for the high-pressure compressor and to a lower surge limit LPdet as compared with the nominal operating line LFnom and with the nominal surge limit LPnom.

The regulation of the turbojet as performed by the computer of the full authority digital electronic control (FADEC) of the turbojet for the purpose of providing protection against surging is not performed by measuring the intrinsic parameters of the compressor, such as the air flow rate at its inlet and the inlet and outlet total pressures, but rather by using sensors that are less expensive, more robust, easy to install, and presenting a greater dynamic range that serve to measure the rate at which fuel is injected into the combustion chamber of the turbojet, the temperature at the inlet to the compressor, the static pressure in the combustion chamber, and the speed XNR of the turbojet. It is possible to use sensors of this type because there exist known relationships, on certain assumptions, between the reduced speed of the turbojet and the reduced flow rate of air at the inlet to the compressor, and between the ratio of the total pressures at the inlet and the outlet of the compressor and the ratio of the fuel flow rate C over the pressure P at the outlet from the high-pressure compressor. On the basis of those assumptions, protection against surging is provided by calculating a limit ratio of fuel flow rate over pressure C/P (also referred to as a high limit value BH or indeed a surge limit value) corresponding to the lowest surge limit LPdet that takes account of the above-mentioned phenomena that might affect the operation of the turbojet (and in particular its regulation). FIG. 1B shows this high limit value BH compared with the nominal operating line LFnom' of the compressor of the compressor, both expressed as the ratio C/P plotted against the speed XNR of the turbojet.

Nowadays airplane manufacturers have ever more stringent requirements concerning idling thrust from new-generation engines. These requirements lead to new problems in terms of margin in order to be able to envisage idling on the ground with smaller and smaller levels of thrust, in other words at slower and slower engine speeds, where engine speed is one of the elements that is the most representative of the thrust from the turbojet.

Specifically, idling thrust that is too small can lead to a phenomenon of underspeed or of acceleration-blocking in the turbojet. Underspeed of a turbojet is manifested by an abnormal drop of the engine speed of the turbojet, in other words an abnormal deceleration of the turbojet, even though its fuel flow rate setpoint is on its above-mentioned high limit value BH, which is supposed to protect it against the compressor surging.

In order to preserve the turbojet from such a risk of underspeed, it is already known, while regulating the turbojet, to take into consideration an additional protection margin for the turbojet against underspeed (also referred to as the "underspeed margin", expressed in terms of the ratio of fuel flow rate over pressure C/P). Nevertheless, taking such a margin into account generally leads to increasing the thrust from the turbojet while it is idling in order to ensure that, while it is idling, the turbojet presents good stable operation and good acceleration times.

There therefore exists a need for a method of controlling the thrust from an idling turbojet that makes it possible to ensure proper operation of the turbojet, while also satisfying the ever more severe requirements of airplane manufacturers.

OBJECT AND SUMMARY OF THE INVENTION

The present invention satisfies this need in particular by proposing a method of controlling idling thrust from a turbojet subjected to fuel flow rate regulation by means of a high limit value for providing protection against surging of a compressor of the turbojet, the method comprising:

an obtaining step for obtaining a first operating point of the turbojet on the high limit value corresponding to a first thrust value, the high limit value taking account of an underestimate of the rate at which fuel is being injected into the combustion chamber of the turbojet while regulating the turbojet;

a first turbojet control step for reaching the first operating point;

a monitoring step for monitoring the turbojet in order to detect underspeed of the compressor; and if underspeed is detected:

an obtaining step for obtaining a second operating point that corresponds to a second thrust value from the turbojet greater than the first value, and that, relative to the high limit value, guarantees a margin that is determined to protect the turbojet against underspeed of the compressor; and a second turbojet control step for reaching the second operating point.

Correspondingly, the invention also provides a control device for controlling idling thrust from a turbojet subjected to fuel flow rate regulation by means of a high limit value for providing protection against surging of a compressor of the turbojet, the device comprising:

an obtaining module for obtaining a first operating point of the turbojet on the high limit value corresponding to a first thrust value, the high limit value taking account of an underestimate of the flow rate at which fuel is being injected into the combustion chamber of the turbojet while regulating the turbojet;

a control module suitable for controlling the turbojet to reach the first operating point;

a monitoring module for monitoring the turbojet and suitable for detecting underspeed of the compressor; and modules that are activated if underspeed is detected by the monitoring module:

for obtaining a second operating point that corresponds to a second thrust value from the turbojet greater than the first value, and that, relative to the high limit value, guarantees a margin that is determined to protect the turbojet against underspeed of the compressor; and for controlling the turbojet to reach the second operating point.

The invention thus provides an astute mechanism that enables the thrust from a turbojet to be adapted as a function of a real risk of its compressor suffering underspeed by taking into account the measurement inaccuracies concerning the fuel flow rate used for regulating the turbojet. This mechanism, while continuing to protect the turbojet against surging of its compressor, thus avoids using a worst-case policy that always assumes there is a risk of underspeed while controlling the turbojet, and instead it adapts to the behavior of the turbojet. More precisely, the turbojet is controlled initially so as to reach a first operating point corresponding to a "low" first thrust value, and then, if that first thrust value is found to be insufficient so that it leads to underspeed of the turbojet, a transition is applied to a second operating point corresponding to a second thrust value higher than the first so as to avoid any malfunction of the turbojet and so as to guarantee that it can be controlled.

The inventors have advantageously identified that there exist phenomena, such as in particular certain inaccuracies in measuring the rate at which fuel is injected into the combustion chamber of the turbojet or in measuring air bleeds (i.e. leaks) at the outlet from the compressor of the turbojet, that have a positive impact on the surge margin of the compressor (i.e. that reduce any risk of surging) but that can penalize the controllability of the turbojet when it is idling (e.g. idling on the ground).

Thus, more specifically, injecting fuel into the combustion chamber of the turbojet at a rate that is less than the regulation setpoint (e.g. because the fuel flow rate is overestimated by the sensor) is without risk concerning surging of the compressor, but it may prevent the turbojet from accelerating correctly, and might even lead to the turbojet suffering underspeed (i.e. decelerating instead of accelerating).

Similarly, an excessive leak of air at the outlet from the compressor (e.g. because the air leakage is underestimated) lowers the operating line of the compressor and thus lowers its risk of surging, but also modifies the pressure ratio compared with the ratio of fuel flow rate over pressure C/P. This phenomenon has a similar effect on the above-mentioned error in measuring the fuel flow rate.

Astutely, the inventors propose controlling the thrust from the turbojet while taking account of these phenomena. Because a measurement inaccuracy concerning the fuel flow rate can be estimated from the specifications of the fuel flow rate sensors more easily than an inaccuracy in measuring air bleeds (the phenomena governing measurement uncertainty concerning fuel flow rate, e.g. such as temperature and type of fuel, and dispersion in the sensor for measuring the position of the fuel flow modulation valve, are themselves better understood than the phenomena governing measurement inaccuracies concerning air flow rate and involving a plurality of sensors), the invention proposes adapting the thrust of the turbojet by acting in real time to estimate its needs in terms of underspeed margin from the measurement inaccuracies about fuel flow rate that are actually encountered on a turbojet. More specifically, the inventors rely on the principle that a fuel flow rate cannot simultaneously be overestimated and underestimated by a fuel flow rate sensor. This serves to avoid the drawbacks of the prior art, which tends to treat measurement inaccuracies about fuel flow rate always in the same manner, even though they can sometimes be penalizing in one direction for surging or otherwise they can be penalizing in an opposite direction for underspeed.

When controlling the turbojet (i.e. controlling it to reach a first operating point), the thrust control logic proposed by the invention thus advantageously consists in considering initially only measurement inaccuracies about the fuel flow rate that might have an impact on the surge margin, and more particularly those inaccuracies that lead to the fuel flow rate being underestimated (i.e., at this stage, no account is taken of inaccuracies that could lead to the fuel flow rate being overestimated, which would have an impact on the underspeed margin of the turbojet).

Thus, by way of example, the first operating point of the turbojet is chosen to be an operating point that takes account of an underspeed margin relative to phenomena that might affect the regulation of the turbojet, with the exception of measurement inaccuracies about the fuel flow rate.

The first operating point of the turbojet, which is determined in application of this strategy, may also correspond to a zero residual margin relative to the high limit value in terms of fuel flow rate. This serves to minimize the first thrust value from the turbojet while idling.

Thereafter, should this turn out to be pertinent, in other words if the first thrust value is too small and leads to underspeed of the turbojet, a transition is applied to a second thrust value that is greater than the first thrust value and that takes account of a predetermined underspeed margin (the turbojet is controlled to reach a second operating point). The underspeed margin taken into consideration is preferably determined in such a manner as to take account of an overestimate of the rate at which fuel is being injected into the combustion chamber of the turbojet while regulating the turbojet, estimated in particular on the basis of specifications for the fuel flow rate sensor used and on the basis of physical equations of the turbojet.

This mechanism for controlling the thrust from the turbojet as proposed by the invention makes it possible to ensure that the turbojet remains controllable by proposing a new, relatively low, nominal thrust level while idling and it enables the needs specified by airplane manufacturers to be satisfied. The second operating point of the turbojet corresponding to the second thrust value is naturally selected in such a manner as to enable the turbojet to transition from the first thrust value to the second thrust value. It depends on the turbojet which is modeled by means of its operating line on which the second operating point lies.

It should be observed that this second operating point is preferably selected so as to guarantee that the turbojet is controllable independently of the conditions of measuring the fuel flow rate. Measurement inaccuracies about the fuel flow rate can depend on the temperature of the fuel, such that the measurement error is not necessarily constant. As soon as underspeed is detected, the underspeed margin is preferably selected so as to make it possible to adopt deterministic safety conditions (i.e. conditions that are independent of the conditions of fuel measurement) so as to avoid malfunction of the turbojet.

In a preferred implementation of the invention, during the monitoring step, underspeed of the compressor is detected when a gradient of the compressor speed is negative for a fuel flow rate setpoint corresponding to the high limit value.

This implementation provides a real-time indication about underspeed of the turbojet that is simple and reliable.

In a particular implementation, the high limit value is determined by adjusting the theoretical limit value for fuel flow rate representing various phenomena having an impact on regulating the turbojet, with the exception of inaccuracies in measuring the fuel flow rate. This theoretical limit value represents a surge line of the compressor.

In similar manner, in a particular implementation, the first operating point and the second operating point lie on an operating line of the compressor of the turbojet, that takes account of the phenomena that have an impact on regulating the turbojet.

Such phenomena include in particular aging of the turbojet, heat transfers, component dispersions, inaccuracies of sensors other than the fuel measurement sensor, etc. The impact of these phenomena on the high limit value for fuel flow rate regulation and the operating line of the turbojet can be determined in manner known to the person skilled in the art, in particular on the basis of information supplied by the airplane manufacturer (e.g. components specifications), or by experiment.

Thus, by way of example, the following phenomena are taken into account for lowering the theoretical limit value and for determining the high limit value: manufacturing dispersions of components; air flow distortion; temperature transients; wear of clearances in the compressor; etc.

Likewise, the following phenomena are taken into account when determining the operating line on which the operating points used in the invention lie: general aging of the turbojet; distortion; temperature transients; engine transients (acceleration); power take-offs for the operation of the airplane (electricity generator, hydraulic pumps), etc.

In an implementation of the invention, the second control step comprises:
  increasing the high limit value;
  increasing the flow rate at which fuel is injected into the combustion chamber of the turbojet; and
  acting on at least one variable-geometry element of the turbojet, such as for example a handling bleed valve of the compressor of the turbojet.

In a particular implementation, the various steps of the control method are determined by computer program instructions.

Consequently, the invention also provides a computer program on a data medium, the program being suitable for being performed in a control device, or more generally in a computer, the program including instructions adapted to performing steps of a control method as described above.

The program may use any programming language, and be in the form of source code, object code, or code intermediate between source code and object code, such as in a partially compiled form, or in any other desirable form.

The invention also provides a computer readable data medium including computer program instructions as mentioned above.

The data medium may be any entity or device capable of storing the program. By way of example, the medium may comprise storage means such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, which may be conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In a particular embodiment, the control device is incorporated in the computer of the full authority digital electronic control (FADEC) device of the turbojet.

The invention also provides a turbojet including a control device of the invention.

In other implementations and embodiments, it is also possible to envisage that the control method, the control device, and the turbojet of the invention present in combination all or some of the above-specified characteristics.

BRIEF DESCRIPTION OF THE DRAWINGS

Other characteristics and advantages of the present invention appear from the following description given with reference to the accompanying drawings, which show implementations having no limiting character. In the figures:

FIG. 5 shows the operating points selected for use in the control method of the invention;

FIG. 6 shows the steps performed in order to detect underspeed of the compressor, in a particular implementation of the invention.

DETAILED DESCRIPTION OF THE INVENTION

Figure 1A:
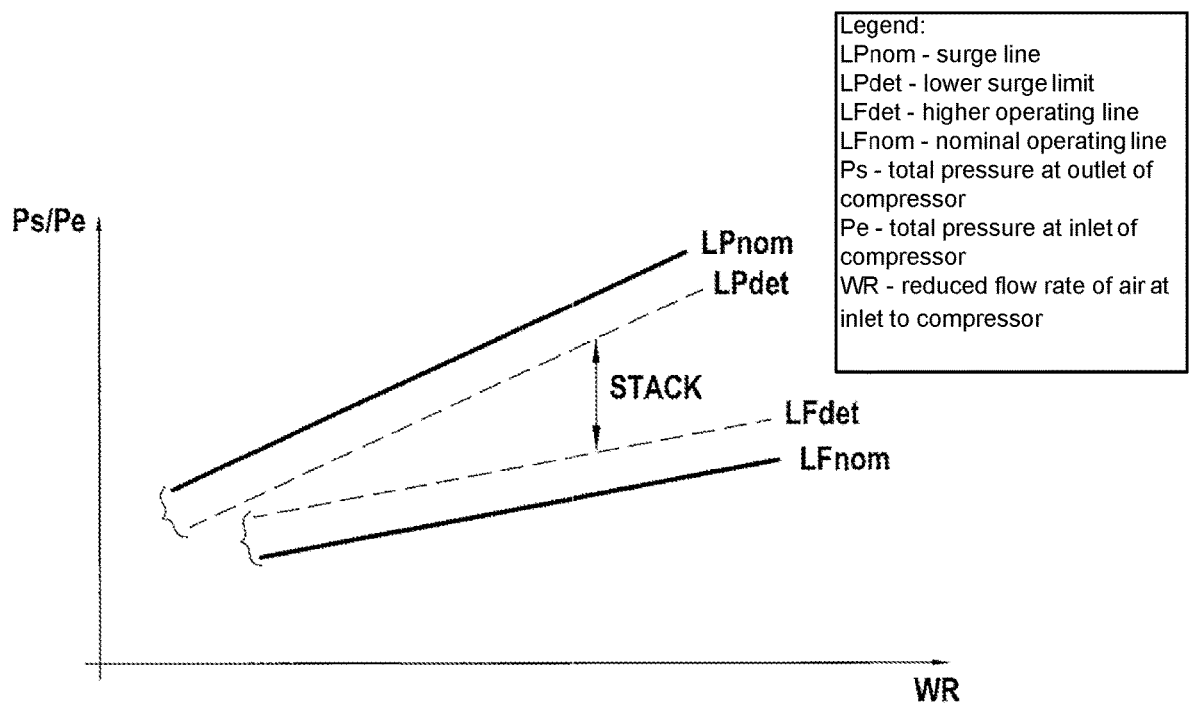
FIGS. 1A and 1B, described above, are diagrams showing the principle of regulating a turbojet by means of a high limit value for fuel flow rate.
Figure 1B:
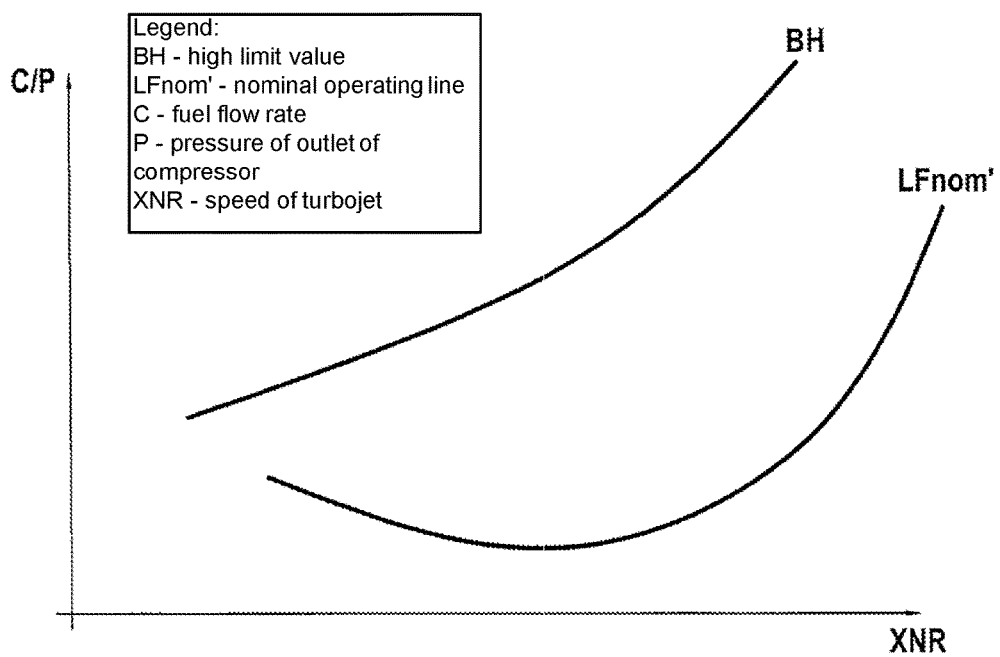
Figure 2:
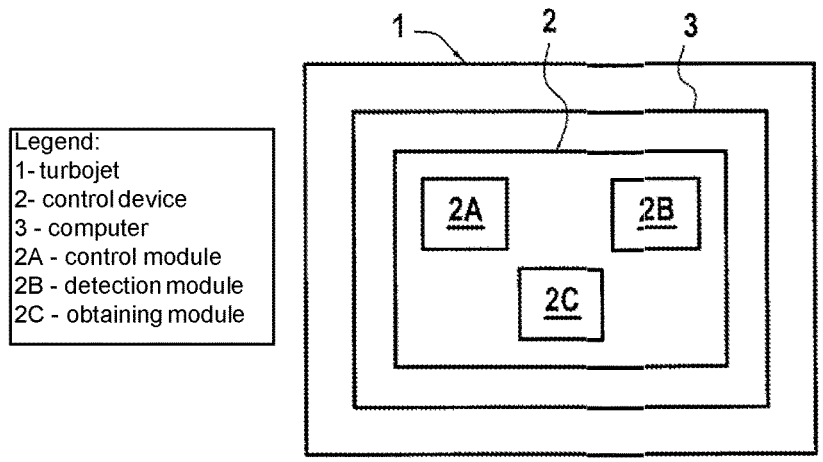
FIG. 2 is a diagram showing a control device and a turbojet in accordance with the invention, in a particular embodiment.

FIG. 2 is a diagram showing, in its environment, a turbojet 1 in accordance with a particular embodiment of the invention.

In the embodiment described herein, the turbojet 1 is a two-spool bypass turbojet for propelling an airplane, having a low-pressure compressor and a high-pressure compressor (not shown in FIG. 2). Nevertheless, the invention applies to other turbojets, e.g. such as a single-spool turbojet, and also to other types of aircraft.

In accordance with the invention, the idling thrust from the turbojet 1 is controlled by a thrust control device 2 of the invention, embedded in the turbojet 1. More precisely, in the presently-described embodiment, the thrust control device 2 is incorporated in the computer 3 of the full authority digital electronic control (FADEC) of the turbojet.

As mentioned above, the device 2 controls the idling thrust from the turbojet 1 potentially in two stages:

in a first stage it controls the turbojet 1 using a control module 2A such that the turbojet 1 reaches a first operating point P1 corresponding to a "low" first thrust THR1, this first operating point being determined so as to protect the turbojet 1 against its high-pressure compressor surging; and then in a second stage, if it is found that the thrust THR1 is too low and is giving rise to underspeed of the high-pressure compressor of the turbojet 1, the control device 2 controls the turbojet 1 by using its control module 2A so that the turbojet reaches a second operating point P2 corresponding to a second thrust THR2 that is higher than the first thrust, this second operating point being determined so as to protect the turbojet 1 not only against surging of its high-pressure compressor, but also against underspeed thereof.

Each operating point P1 and P2 is defined herein by a pair of values comprising:

the speed of rotation of the high-pressure compressor of the turbojet 1; and the ratio C/P where C is the fuel flow rate setpoint and P is the outlet pressure from the high-pressure compressor.

For simplification purposes, and unless mentioned to the contrary, the term "compressor" is used below in this description to designate the high-pressure compressor of the turbojet.

The changeover from one control mode to the other (i.e. from idling characterized by the thrust THR1 to idling characterized by the thrust THR2) is triggered by detecting underspeed of the high-pressure compressor of the turbojet 1 by means of a detection module 2B that is provided for this purpose. The operating points P1 and P2 used by the control module 2A are obtained by an obtaining module 2C. In the presently-described implementation, these operating points are determined beforehand on the basis of the characteristics of the turbojet 1 and of its components, as described in greater detail below.

In the presently-described embodiment, the above-described functional modules 2A, 2B, and 2C for control, for underspeed detection, and obtaining operating points are software modules implemented by the control device 2 in the context of the logic for regulating the turbojet 1 as performed by the FADEC 3.

Figure 3:
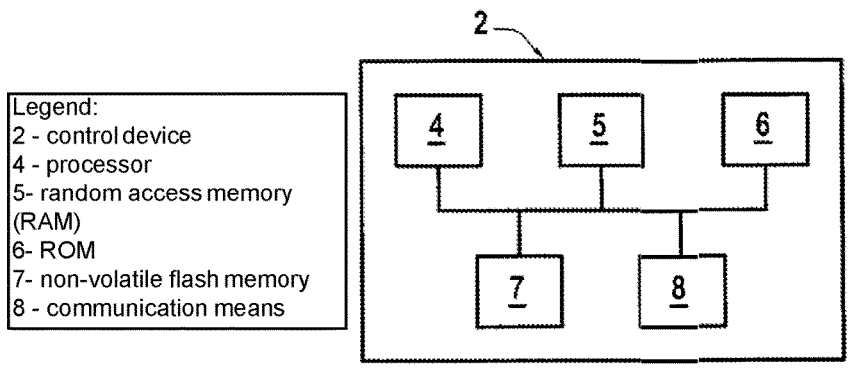
FIG. 3 is a diagram showing the hardware architecture of the FIG. 2 control device.

For this purpose, the control device 2 has the hardware architecture of a computer (which relies in this example on the hardware architecture of the FADEC 3), as shown diagrammatically in FIG. 3. In particular, it comprises a processor 4, a random access memory (RAM) 5, a ROM 6, a non-volatile flash memory 7, and communication means 8 for communicating with the components of the turbojet 1. These hardware elements may optionally be shared with other regulation units of the FADEC 3.

The ROM 6 of the control device 2 constitutes a data medium in accordance with the invention that is readable by the processor 4 and that stores a computer program in accordance with the invention including instructions for executing steps of a control method in accordance with the invention as described below with reference to FIG. 4.

Figure 4:
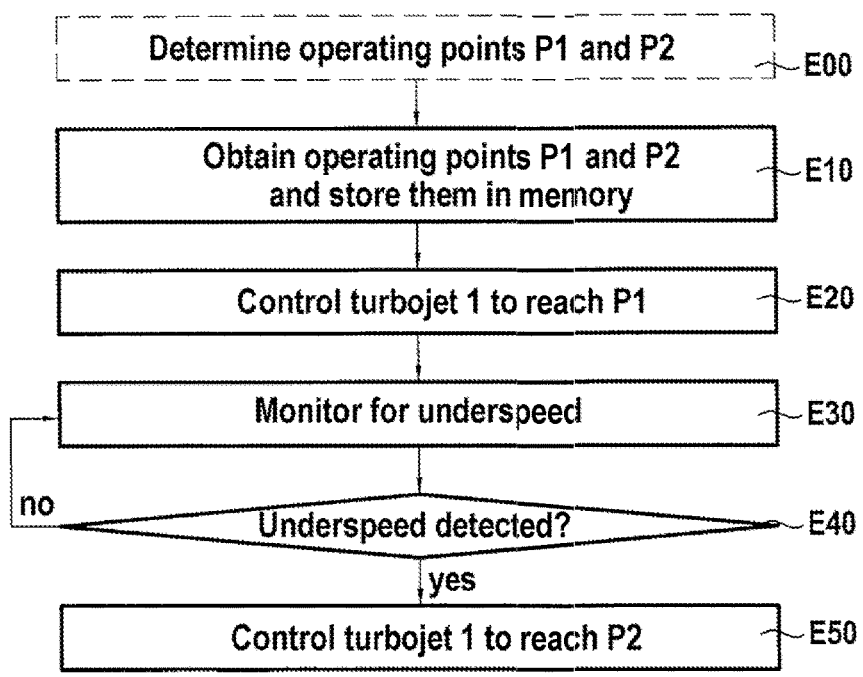
FIG. 4 is a flow chart showing the main steps of a control method of the invention in a particular implementation in which the method of the invention is performed by the FIG. 2 control device.

FIG. 4 is a flow chart showing the main steps of the method of controlling the idling thrust from the turbojet 1 in a particular implementation of the invention in which it is performed by the control device 2 of FIG. 2. The present description concerns controlling the thrust from the turbojet 1 while it is idling on the ground.

In the presently-described implementation, the operating points P1 and P2 used for thrust control by the control device 2 are determined during a step prior to controlling thrust properly speaking (step E00). This step may be performed by an operator or by a device that is different from the control device 2; the operating points P1 and P2 are then supplied to the control device 2 and more particularly to its obtaining module 2C, e.g. via the communication means 8. They are then stored by the obtaining module 2C in the non-volatile memory 7 of the control device 2 (step E10).

As mentioned above, in order to determine these operating points, the inventors have made use of the fact that any inaccuracy in measuring the real flow rate of the fuel injected into the combustion chamber of the turbojet 1 cannot lead simultaneously to an underestimate and to an overestimate of the flow rate of the fuel. In other words, the sensor that is used in the regulation of the turbojet for the purpose of estimating the flow rate of fuel injected into the combustion chamber cannot simultaneously underestimate and overestimate the flow rate. Such a sensor is itself known and is not described in detail herein.

As emphasized above, an overestimate of the fuel flow rate (which results in the fuel flow rate being too small) does not lead to any risk of the compressor surging, but can prevent the turbojet 1 from accelerating correctly, and may even result in underspeed of the high-pressure compressor of the turbojet 1. When such a situation is detected, the inventors advantageously propose providing an additional protection margin against underspeed of the compressor so that not only is the turbojet protected against surging but also against underspeed of its compressor.

Nevertheless, in order to optimize the idling thrust from the turbojet 1, such an additional protection margin against underspeed (referred to in the present description as the "underspeed margin") is used only when it is detected that the fuel flow rate is being overestimated, in other words, once it is confirmed that there is underspeed of the high-pressure compressor of the turbojet 1. This makes it possible, under contrary circumstances, to lower the thrust from the turbojet 1, and thus comply with the ever more stringent constraints of airplane manufacturers.

With reference to FIG. 5, in the presently-described implementation, in order to perform this strategy, the operating point P1 is determined to be the point of intersection between two curves, namely:

a high limit value Bmax for the ratio C/P; and the operating line Lpc of the high-pressure compressor of the turbojet 1.

The high limit value Bmax is obtained by adjusting a theoretical high limit value BT so as to take account of an underestimate of the rate at which fuel is injected into the combustion chamber of the turbojet 1 while regulating the turbojet. In other words, the theoretical limit value BT is lowered by a margin Msurge for protecting the turbojet against surging of its high-pressure compressor. This surge margin Msurge can be estimated easily from information supplied by the airplane manufacturer or by the manufacturer of the sensor used for measuring the flow rate at which fuel is injected into the combustion chamber (i.e. in particular on the basis of the accuracy of the sensor). It can be quantified and converted into a value for the ratio C/P by using physical equations of the turbojet 1.

The theoretical limit value BT is a regulation high limit value expressed in terms of C/P as determined in known manner, and it represents various phenomena impacting regulation of the turbojet, such as for example: aging of the turbojet, heat transfers, measurement inaccuracies of sensors involved in the regulation (e.g. temperature, pressure, etc. sensors), but with the exception of the measurement inaccuracies of the fuel flow rate sensor, in order to avoid taking these inaccuracies into account more than once.

The high limit value Bmax thus makes no provision for an underspeed margin relative to measurement inaccuracies of the fuel flow rate sensor.

The operating line Lpc of the compressor is a worst-case operating line, obtained in known manner, by adjusting the mean operating line Lmean of a high-pressure compressor of an average turbojet when new so as to take account of the various above-mentioned phenomena, i.e. aging of the turbojet, dispersions of the components, and measurement inaccuracies of sensors involved in regulation (e.g. temperature, pressure, etc. sensors). In other words, consideration is given to the operating line of a high-pressure compressor of a turbojet having a fuel flow sensor of average behavior.

The operating point P1 as selected in this way provides no residual margin (margin stack-up) between the surge line Bmax and the operating line Lpc of the high-pressure compressor. Nevertheless, the surge line Bmax includes an underspeed margin that takes account of the various phenomena that might have an impact on regulating the turbojet 1, with the exception of measurement inaccuracies of the fuel flow rate sensor.

The operating point P1 as defined in this way is characterized by the speed XNR1 of the high-pressure compressor and by the fuel flow rate over pressure ratio (C/P)1. The speed XNR1 corresponds to an idling thrust THR1 from the turbojet 1.

It should be observed that certain turbojets have handling bleed valves associated with the high-pressure compressor that make it possible to restore the margin between the surge limit and the operating point. This margin is used to determine the nominal acceleration rate of the turbojet. The existence of such valves can lead to modifying the value of the limit value expressed in terms of C/P. When performing the invention, if such valves are present they are consequently preferably taken into account in order to determine the speed from which the turbojet is capable of accelerating and the corresponding acceleration rate, in other words for determining the operating point P1.

The operating point P2 is determined as being the point of intersection between two curves, namely:
a high limit value Bmin for the ratio C/P; and
the operating line Lpc of the high-pressure compressor of the turbojet 1.

The high limit value Bmin is obtained by adjusting the high limit value Bmax so as to take account of an overestimate of the rate at which fuel is being injected into the combustion chamber of the turbojet 1 while regulating the turbojet. In other words, the limit value Bmax is now lowered by an additional margin Mundersp for protecting the turbojet against underspeed of its high-pressure compressor, which additional margin takes account of inaccuracies in measuring the fuel flow rate, and more precisely of an overestimate of the rate at which fuel is being injected into the combustion chamber of the turbojet while regulating the turbojet 1. This underspeed margin Mundersp can be estimated easily from information supplied by the airplane manufacturer or by the manufacturer of the sensor used for measuring the flow rate of fuel injected into the combustion chamber (i.e. in particular from the accuracy of the sensor). It can be quantified and converted into a value for the ratio C/P by using physical equations of the turbojet 1. Nevertheless, it should be observed that the measurement inaccuracies concerning the fuel flow rate are associated not only with the sensor used for measuring the flow rate, but can also vary as a function of the conditions under which the measurements are taken. For example, the accuracy of a flow modulation valve is associated with the temperature of the fuel. The accuracy error in the measurement taken by the sensors is therefore not necessarily constant all along a flight. In order to determine the margin Mundersp, it is preferable to consider deterministic safety conditions (in other words, the margin Mundersp is estimated while using a worst-case scenario).

The high limit value Bmin thus provides both a surge margin and an underspeed margin both by taking account of measurement inaccuracies concerning the fuel flow rate.

The operating point P2 as defined in this way is characterized by a speed XNR2 of the high-pressure compressor and by a fuel flow rate over pressure ratio (C/P)2. The speed XNR2 corresponds to an idling thrust THR2 from the turbojet 1.

There follows a description of how the thrust from the turbojet 1 is controlled in accordance with the invention by the control device 2 while the airplane having the turbojet 1 is idling on the ground. As mentioned above, it is assumed that the values of the operating points P1 and P2 have been obtained by the obtaining module 2C of the control device 2 and have been stored in the non-volatile memory 7 (step E10).

When idling on the ground is detected, the control device 2 controls the turbojet 1 via the control module 2A so that it reaches the first operating point P1 and the first thrust THR1 (step E20). This control is performed in conventional manner taking account of the fuel flow rate setpoint (C/P)1 and of the engine speed XNR1 that are associated with the operating point P1.

Furthermore, the detection module 2B of the control device 2 is used to monitor whether underspeed appears in the turbojet 1 controlled to idle at this speed (step E30).

In the presently-described implementation, this monitoring is performed in a manner shown diagrammatically in FIG. 6.

More precisely, the detection module 2B uses a measurement of the speed XN25 of the high-pressure compressor to evaluate the speed gradient $dXN25/dt$ in manner known to the person skilled in the art (step E31). Thereafter, it determines whether this gradient is negative or zero (test step E32).

If the gradient is positive, underspeed has not been detected, and a new gradient is evaluated from a new measurement of the speed XN25 of the high-pressure compressor (response "no" in step E32).

In parallel, the detection module 2B also evaluates the fuel flow rate WF1 corresponding to the limit value (C/P)1 for providing protection against surging by using the following equation (step E33):

$$WF1 = (C/P)1 \times PS3 \times \sqrt{\frac{T25}{Tstd}}$$

where PS3 designates the static pressure of the high-pressure compressor, T25 designates the total temperature at the inlet of the high-pressure compressor, and Tstd designates the standard temperature at sea level (i.e. equal to 288.15 K (Kelvin), i.e. 15° C. (Celsius)).

Thereafter, the fuel flow rate setpoint value WFc used for regulating the turbojet 1 is compared with this value WF1 by the detection module 2B (test step E34). The detection module 2B obtaining the setpoint value WFc from the FADEC does not raise any particular difficulty and is not described herein.

If the setpoint value WFc is different from the high limit value WF1 (to within a predetermined tolerance threshold), no underspeed has been detected and monitoring is continued (response "no" in step E34).

If the speed gradient $dXN25/dt$ is negative (response "yes" in step E32), and if the setpoint value WFc is at the high limit value WF1 (response "yes" in step E34) (response "yes" in test step E35), then underspeed of the high-pressure compressor has been detected by the detection module 2B (step E36).

Otherwise (response "no" in test step E35), underspeed has not been detected and the monitoring performed by the detection module 2B of the control device 2 in application of steps E31-E35 continues.

If underspeed is detected by the detection module 2B (response "yes" in test step E40), then a transition of the turbojet 1 is initiated to the thrust THR2 that is higher than the current thrust THR1. In other words, the assumption whereby the fuel flow rate sensor is underestimating the rate at which fuel is being injected into the combustion chamber of the turbojet (and which corresponds to how the operating point P1 is defined) is not correct, i.e. the sensor is in fact overestimating the real flow rate at which fuel is being injected into the combustion chamber. There therefore exists a need for an underspeed margin while idling in the face of measurement inaccuracies concerning the fuel flow rate between the operating line Lpc of the compressor and the high limit value Bmax (i.e. it is necessary to use the high limit value Bmin).

For this purpose, the control device 2A of the control device 2 controls the turbojet 1 so as to cause it to reach the operating point P2 stored in the non-volatile memory 7 (step E50). This amounts to increasing the speed setpoint for the compressor (from the value XNR1 to XNR2). This setpoint value XNR2 is determined so as to guarantee that the compressor will not suffer underspeed.

This control step may comprise at least one of the following steps:

- increasing the high limit value (possible correction of the high limit value from Bmax to BT in the zone Z1 shown in FIG. 5);
- increasing the rate at which fuel is injected into the combustion chamber (a direct consequence of changing the operating point from P1 to P2, made possible by increasing the limit value); and/or
- acting on at least one variable-geometry element of the turbojet, such as for example a transient action on a handling bleed valve (HBV) of the high-pressure compressor.

Figure 7A:
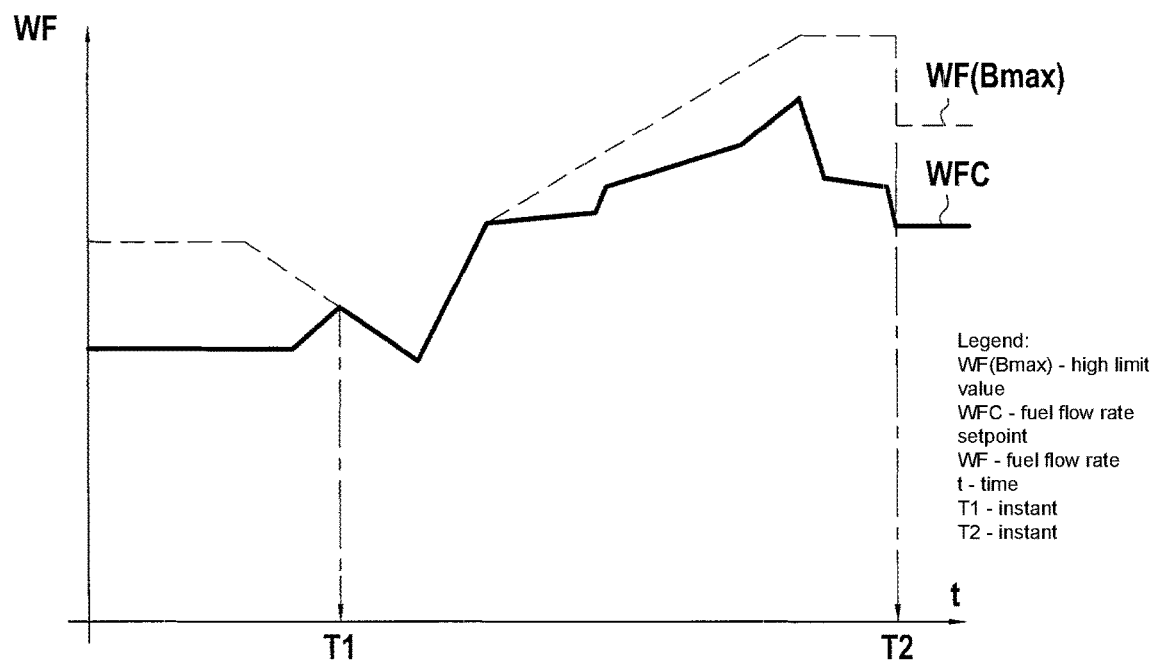
FIGS. 7A and 7B show an example of applying the control method of the invention.
Figure 7B:
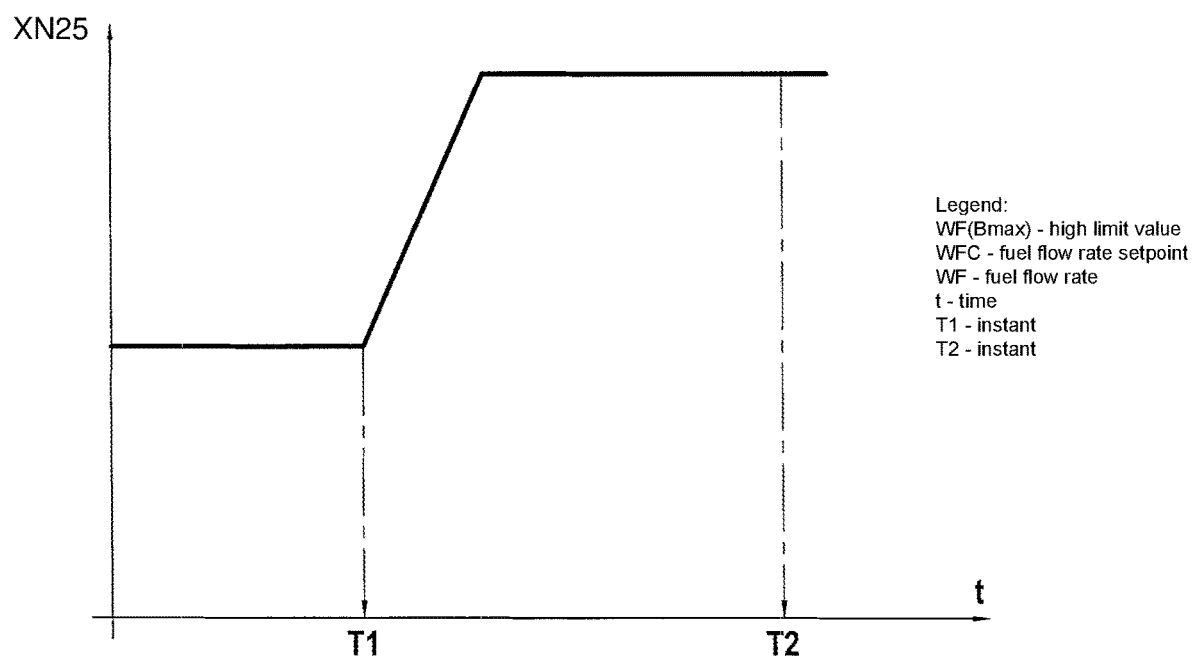

FIGS. 7A and 7B show the logic implemented by the above-described control device 2, and shows examples of actions performed to control the turbojet 1 towards the operating point P2.

FIG. 7A shows how the fuel flow rate setpoint WFc varies as a function of time (continuous line curve) relative to the high limit value WF (Bmax) (dashed line curve).

FIG. 7B shows how the reduced speed XNR25 of the high-pressure compressor varies as a function of time.

At instant t=T1, underspeed of the high-pressure compressor is detected while the fuel flow rate setpoint is on the high limit value Bmax. When underspeed is detected by the detection module 2B, the limit value Bmax is automatically raised by the control module 2A (applying a predetermined bias) and the speed setpoint XNR25 is increased to reach the value corresponding to the value XNR2 of the operating point P2, so as to guarantee that the high-pressure compressor does not suffer underspeed.

Increasing the limit value makes it possible for the turbojet 1 to accelerate up to the new idling speed XNR2 corresponding to the operating point P2, which is reached at instant T2. When the new idling speed is reached, the limit value is returned by the control module 2A to its nominal value. In contrast, in this example, the speed XNR2 is maintained throughout the duration of the flight. This serves to ensure that the turbojet operates properly throughout the flight without being concerned about determining whether or not the causes for underspeed have disappeared during the flight.

The invention claimed is:

1. A method of controlling idling thrust from a turbojet subjected to fuel flow rate regulation along a high limit value reference line for providing protection against surging of a compressor of the turbojet, said method comprising:

obtaining a first operating point of the turbojet on the high limit value reference line corresponding to a first thrust value, said high limit value reference line not accounting for a potential overestimate of a fuel flow rate, the fuel flow rate being a rate at which fuel is being injected into a combustion chamber of the turbojet while regulating the turbojet;

controlling the turbojet to reach the first operating point;

monitoring the turbojet in order to detect underspeed of the compressor;

detecting the underspeed of the compressor;

upon the detection of the underspeed of the compressor, obtaining a second operating point of the turbojet on a second reference line that accounts for the potential overestimate of the fuel flow rate, the second operating point corresponding to a second thrust value from the turbojet greater than the first thrust value, and that, relative to the high limit value reference line, guarantees a margin that is determined to protect the turbojet against the underspeed of the compressor; and controlling the turbojet to reach the second operating point, wherein the controlling the turbojet to reach the second operating point comprises acting on at least one variable geometry element of the turbojet.

2. A method according to claim 1, wherein the underspeed of the compressor is detected when a gradient of a compressor speed is negative for a fuel flow rate setpoint corresponding to a high limit value.

3. A method according to claim 1, wherein the high limit value reference line is determined by adjusting a theoretical limit value reference line for the fuel flow rate representing phenomena having an impact on regulating the turbojet, with exception of inaccuracies in measuring the fuel flow rate.

4. A method according to claim 1, wherein the controlling the turbojet to reach the second operating point comprises:

increasing a high limit value; and increasing the fuel flow rate.

5. A method according to claim 1, wherein said at least one variable geometry element comprises a handling bleed valve of the compressor of the turbojet.

6. A non-transitory computer readable data medium storing a computer program including instructions configured to execute the method according to claim 1.

7. A control device for controlling idling thrust from a turbojet subjected to fuel flow rate regulation along a high limit value reference line for providing protection against surging of a compressor of the turbojet, said device comprising:

circuitry configured to:

obtain a first operating point of the turbojet on the high limit value reference line corresponding to a first thrust value, the high limit value reference line not accounting for a potential overestimate of a fuel flow rate, the fuel flow rate being a rate at which fuel is being injected into a combustion chamber of the turbojet while regulating the turbojet;

control the turbojet to reach the first operating point;

monitor the turbojet to detect underspeed of the compressor;

detect the underspeed of the compressor;

upon the detection of the underspeed of the compressor, obtain a second operating point of the turbojet on a second reference line that accounts for the potential overestimate of the fuel flow rate, the second operating point corresponding to a second thrust value from the turbojet greater than the first thrust value, and that, relative to the high limit value reference line, guarantees a margin that is determined to protect the turbojet against the underspeed of the compressor; and control the turbojet to reach the second operating point, wherein the control of the turbojet to reach the second operating point comprises acting on at least one variable geometry element of the turbojet.

8. A turbojet including the control device according to claim 7.

* * * * *